(No Model.)
A. O. FRICK.
Valve Gear.
No. 242,623.                                   Patented June 7, 1881.
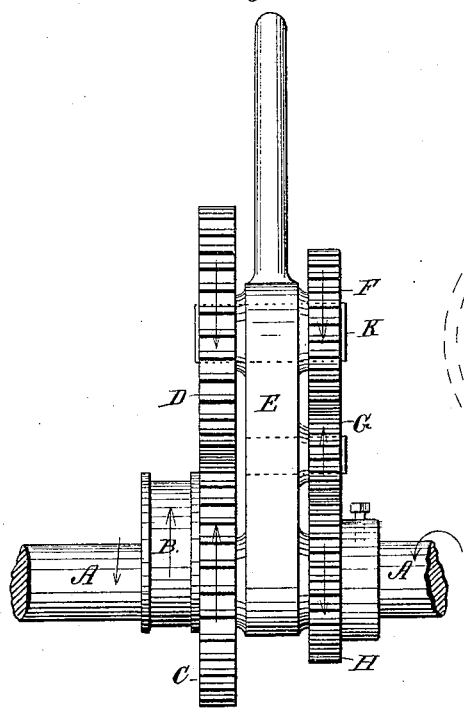
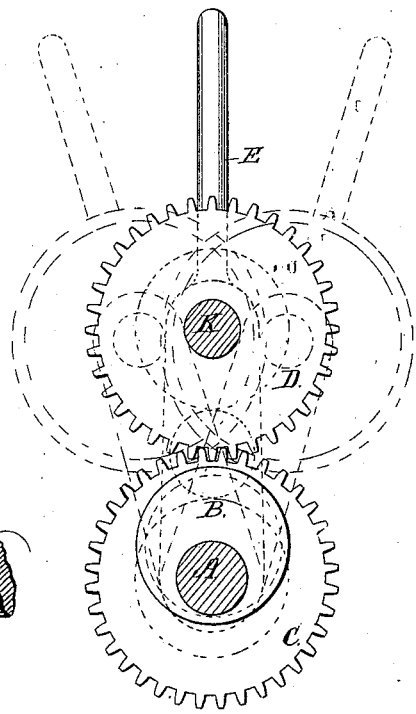
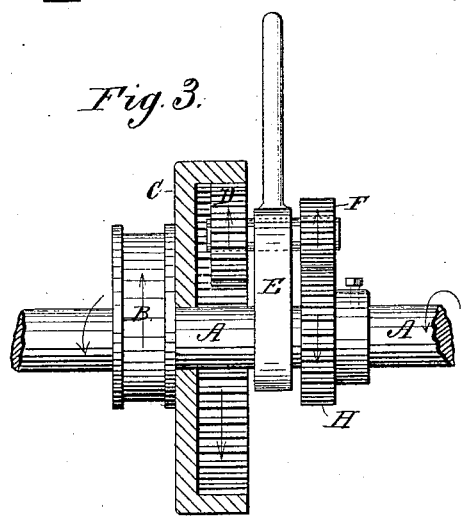
WITNESSES:
W. W. Hollingsworth
Edw. W. Byrn
INVENTOR:
A. O. Frick
BY
ATTORNEYS.

UNITED STATES PATENT OFFICE.

ABRAHAM O. FRICK, OF WAYNESBOROUGH, PENNSYLVANIA.

VALVE-GEAR.

SPECIFICATION forming part of Letters Patent No. 242,623, dated June 7, 1881.

Application filed March 30, 1881. (No model.)

*To all whom it may concern:*

Be it known that I, ABRAHAM O. FRICK, of Waynesborough, in the county of Franklin and State of Pennsylvania, have invented a new and Improved Valve-Gear; and I do hereby declare that the following is a full, clear, and exact description of the same, reference being had to the accompanying drawings, forming part of this specification, in which—

Figure 1 is an edge and Fig. 2 a side view of my invention, and Fig. 3 is a sectional edge view of a modification.

My invention relates to an improvement in valve-gears for changing the relation of the eccentric to the main crank. It is an improvement in that class of valve-gear in which one or more cog-wheels are arranged between a rigid gear-wheel on the shaft and a loose gear-wheel carrying the eccentric; and my improvement consists in the peculiar arrangement of the wheels, as will be hereinafter more fully described.

In the drawings, A represents the main shaft, upon which is arranged the eccentric B, loosely revolving on said shaft, and having a gear-wheel, C, fastened to it, so that they revolve together.

H is the rigid gear-wheel, which is fastened to the main shaft and revolves with it. Between the two gear-wheels C and H, and loosely encircling the shaft A, is an arm or lever, E, carrying three more gear-wheels, D F G. Of these gear-wheels, D is in the same plane with the eccentric gear-wheel and meshes with it peripherally, and is fixed rigidly on the same shaft with the wheel F on the other side of the arm, which shaft passes through and finds a bearing in said arm. The wheel G is journaled upon a pin offsetting from the arm, and it connects the rigid wheel H on the main shaft with the gear-wheel F, all of which wheels are arranged in the same plane and mesh with each other peripherally, with their lines of contact parallel with the main shaft.

Now, when the shaft A revolves the rigid wheel H revolves with it, as shown by the arrow, and this in turn rotates wheel G in the opposite direction, while G gives to the wheels F and D a rotation in the same direction with the main shaft, and this causes the eccentric-wheel C and its attached eccentric to be rotated upon the shaft in the opposite direction from that in which the shaft is moving. Now, it will be seen that if the arm E be moved about the shaft the wheels C D F G do not move around in the same relation to each other, for, wheel H being rigidly connected to the shaft, as the lever is deflected the wheel G and each of the others is turned about its axis, as well as moved bodily by the lever, and the result is that the eccentric-wheel C and eccentric B are turned about the shaft, so as to alter the position of the eccentric to the main shaft and cause a cut-off valve to act sooner or later, or to give a contrary movement to the valve, to reverse the engine. By this means the engine can be reversed with only one eccentric and while the engine is in motion. The same arrangement can be used to form a variable and automatic cut-off by connecting the arm with and operating it by the governor.

As a modification of my device I may dispense with the wheel G, as shown in Fig. 3; but in order to get the proper direction of movement for the eccentric, the eccentric-wheel C must have an inwardly-projecting set of teeth and the wheel D must engage with the interior periphery of the said wheel. The same principle is retained, however, and substantially the same arrangement of connecting the tight gear-wheel H to the loose gear-wheel C by a train of wheels arranged in parallel planes and engaging peripherally with each other, with a line of contact between the teeth parallel to the main shaft.

In defining my invention more clearly I would state that I am aware that a rigid wheel on a shaft has been made to impart a reverse movement to a loose eccentric-wheel on the same shaft by an intermediate wheel carrying bevel-gear wheels for substantially the same purpose.

I am also aware that a loose gear-wheel carrying an eccentric has been connected with a rigid gear-wheel on the shaft by a double pinion having different diameters and arranged in the same plane with the gear-wheels on the shaft, as shown in English Patent No. 3,845 of 1875. This arrangement, however, does not act in the same manner that mine does, for the reason that in the normal action of said device these differential wheels do not rotate about their independent axes; but the bearings, or larger wheel carrying these pinions, does rotate, and the change in the position of the eccentric is effected by temporarily stopping the large wheel containing the bearings of the pinion, when the latter are allowed to exert a differential effect by their different diameters to change the position of the eccentric. In my case the gear-wheels all rotate continuously about their independent axes, and the bearings for the wheels, instead of moving continuously with them, are normally stationary, and only moved when an adjustment of the eccentric is required. Furthermore, as these wheels are normally rotating about their centers, it is necessary that F should have the same number of teeth with respect to H that D has to C, so as to cause the eccentric to revolve once to the shaft's once, and prevent one from running away from the other, as would take place in the said English patent if the bearings for the double pinion were normally stationary.

The normally stationary bearings in my case furthermore permit a governor to be connected to the support for said bearings to constitute an automatic action. In my case, moreover, the eccentric rotates in the opposite direction to the shaft.

Having thus described my invention, what I claim as new is—

The combination, with the shaft A, having rigid gear-wheel H and loose gear-wheel C, carrying the eccentric, of the gear-wheels F and D, arranged respectively in the planes of H and C, the wheel F having the same proportion of teeth with respect to H that D has to C, and the said wheels D and F being geared for a normal rotation about their individual axes in a normally stationary frame or support, as and for the purpose described.

ABRAHAM O. FRICK.

Witnesses:
D. M. GOOD, Jr.,
C. E. BESORE.